United States Patent [19]

Rader

[11] Patent Number: 4,794,881
[45] Date of Patent: Jan. 3, 1989

[54] POULTRY WATERING SYSTEM WITH FLOAT BOX AND ELONGATED LINE

[75] Inventor: Helmut Rader, McLean, Va.

[73] Assignee: Monoflo International, Inc., McLean, Va.

[21] Appl. No.: 932,865

[22] Filed: Nov. 20, 1986

[51] Int. Cl.$^4$ .............................................. A01K 39/024
[52] U.S. Cl. ...................................... 119/72.5; 119/78
[58] Field of Search ................ 119/72.5, 78, 79, 80, 119/72, 74; 73/306, 326

[56] References Cited

U.S. PATENT DOCUMENTS

| | | | |
|---|---|---|---|
| 1,202,854 | 10/1916 | Knight | 73/306 |
| 2,771,058 | 11/1956 | Howard | 119/78 |
| 3,008,451 | 11/1961 | Curry | 119/72.5 |
| 3,537,430 | 11/1970 | Peppler | 119/72.5 |
| 3,724,425 | 4/1973 | Thompson | 119/72 |
| 3,874,344 | 4/1975 | Smith | 119/78 |
| 4,402,343 | 9/1983 | Thompson et al. | 137/614.2 |

OTHER PUBLICATIONS

Monoflo "Mini 80" Brochure, 1980.
Ziggity Systems Brochure, "E-Z Sip Drinker", 1981.
Little Giant "Low-Flow" Brochure, 1981.

*Primary Examiner*—Robert P. Swiatek
*Assistant Examiner*—Mary E. McNeil
*Attorney, Agent, or Firm*—Nixon & Vanderhye

[57] ABSTRACT

An inexpensive poultry watering system allows water to be supplied under very low pressure (e.g. a 2 inch head) to nipples or similar water dispensers, without the use of a regulator. Relatively high pressure water is fed into a float box, with a float valve assembly in the box valving the water as it flows into the float box, to establish a level of water in the box. An outlet opening from the box is connected to an elongated (e.g. 8 foot-10 foot) conduit which has the nipples, or other water dispensers, spaced along it. The conduit is suspended by conventional hangers, The float box needs no additional support, being connected to the conduit by a short pipe section and collar. A ballast/support pipe may be mounted above the conduit. The plastic float box has an anti-roost ridge at the apex of its top, and its bottom is sloped from the inlet toward the outlet.

17 Claims, 1 Drawing Sheet

POULTRY WATERING SYSTEM WITH FLOAT BOX AND ELONGATED LINE

BACKGROUND AND SUMMARY OF THE INVENTION

Poultry, and other animal watering systems have as a primary goal the delivery of a clean supply of water directly to the animals with a minimum of water waste, and utilizing equipment that is as inexpensive as possible while still performing the desired delivery function. It is necessary to minimize water waste since excess delivery of water not only is a waste of the water itself, but can contaminate a poultry house so that the birds have a less than desirable growing environment.

It has been difficult in the past to accomplish the mutual goals of clean water delivery, minimum wastage of water, and inexpensive equipment. While some alternative systems to conventional 8 foot watering troughs have been developed—such as overhead water delivery pipes with nipple drinkers, or like dispensers, extending downwardly from the pipes—such systems typically include a water pressure regulator. The water pressure regulator is necessary since the water is supplied under a relatively high pressure (e.g. at least several pounds) to the poultry house, and if the water were dispensed at that pressure there would be an excessive amount of water, and it could be uncomfortable for the birds. However pressure regulators are expensive pieces of equipment and make the cost of the watering system much higher than is desired.

According to the present invention, a poultry watering system, method, and components of the system, are provided which accomplish all of the mutual goals of clean delivery of water directly to the birds; with minimum wastage; and with minimum equipment cost. These goals are accomplished according to the present invention by providing a plastic float box which is operatively connected to the overhead conduit. The float box has a water inlet opening and a water outlet opening, with a valve assembly means provided in operative association with the water inlet so as to selectively allow or prevent the flow of water into the float box, so that the water establishes a predetermined level, or head, within the box. This head of water in the float box then provides the motive force for supplying water to the nipples, or like water dispensers. The head of water established in the float box typically is about 2 inches which is less than is normally obtained using conventional regulators. The float box is of plastic, and has a minimum amount of material, but with an anti-roost ridge on the top thereof. Such a system is much less expensive than conventional system with regulators, yet performs its desired function at least as well as a regulator system.

No specially constructed mounting system is necessary in order to support the watering system according to the invention. The conduit may be supported just as is conventional (e.g. with hangers), the support of the conduit automatically supporting the float box. Preferably the float box is connected in a secure manner to the conduit by a short pipe section and a collar. The conduit preferably is at least about 8 feet long, and typically lengths of 8-10 feet are desirable.

It is the primary object of the present invention to provide an inexpensive poultry watering system or the like for delivering a clean supply of water directly to the birds with a minimum of water spillage. This and other objects of the invention will become clear from an inspection of the detailed description of the drawings and the appended claims.

DETAILED DESCRIPTION OF THE DRAWINGS

Figure 1:
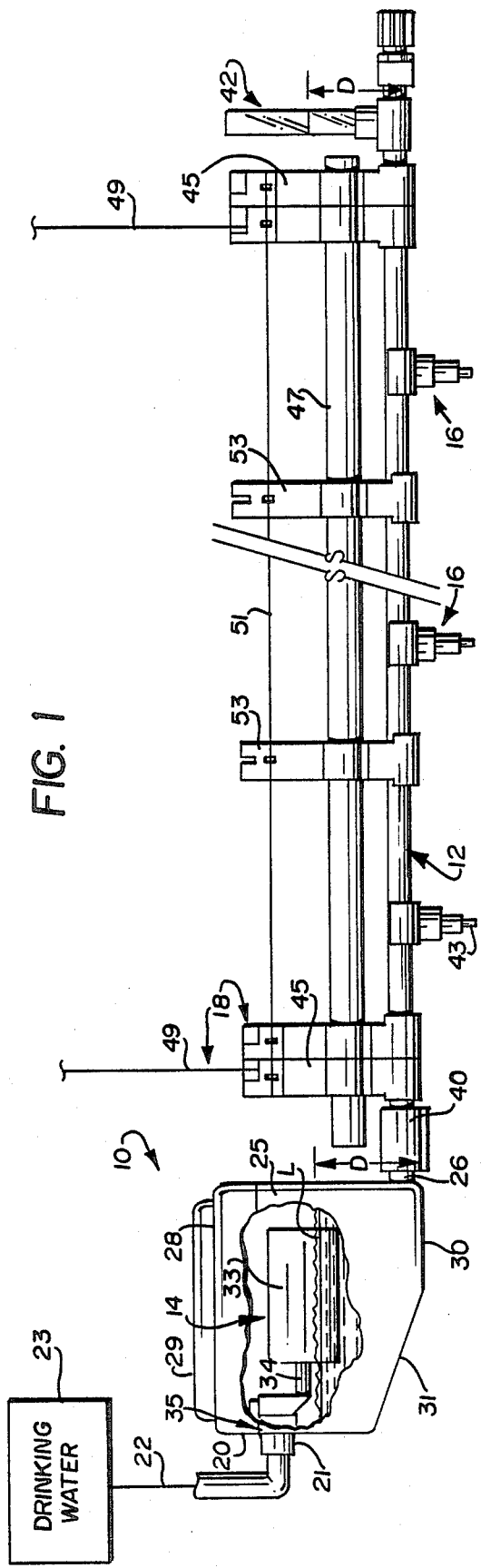
FIG. 1 is a side schematic view of an exemplary poultry watering system according to the present invention, with the side wall of the float box cut away to illustrate the interior components.

The animal watering system of the invention consists essentially of only a few components. These few components comprise a float box 10, an elongated conduit 12, a fluid operated valve assembly 14, an animal-actuated water dispensing means 16, and a mounting means 18 for mounting the conduit 12 so that it is generally horizontal. The float box 10 comprises a hollow body preferably having top, bottom, and side walls. In a side wall 20 thereof is provided an opening which defines an inlet for water entering the float box 10. In FIG. 1, a short pipe section 21 is illustrated extending outwardly from the float box 10 and connected to the inlet opening. The short pipe section is operatively connected to a pipe 22 or the like which is operatively connected to a source of drinking water 23. Typically the pressure of the water supplied from the source 23 is at least about several pounds.

Also disposed in a side wall of the float box 10 is an outlet opening. Preferably the outlet opening is disposed in the side wall 25 which is opposite the side wall 20. In FIG. 1, the short pipe section 26 is operatively connected to the outlet opening, and in the embodiment illustrated in FIG. 1 the inlet opening at pipe section 21 is disposed in an upper portion of the housing, while the outlet opening defined at the short pipe section 26 is disposed in a lower portion of the housing (below the inlet opening).

Figure 2:
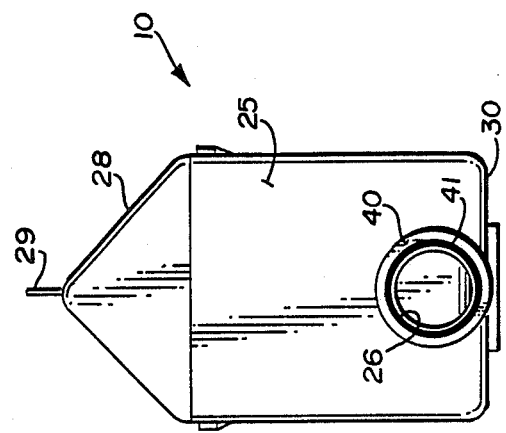
FIG. 2 is an end view (to scale) of the float box of the system of FIG. 1, taken at arrows 2—2.

The float box 10 top 28 is sloped, and as seen in FIG. 2 preferably comprises an anti-roost ridge 29 at the apex thereof. The bottom 30 of the float box 10 preferably has at least a portion (see portion 31 in FIG. 1) thereof which slopes from the side wall 20 toward the side wall 25. This slope is provided so as to save material for the float box since the interior volume of the float box need not be large. Preferably the float box 10 is completely formed of plastic, including as interfitting top and bottom sections. One particularly suitable plastic for forming the float box is sold under the trademark "VALOX" by General Electric.

The float operated valve assembly 14 may be of any suitable conventional construction. Typically it has a float portion 33, a float arm 34, and a valve defined at the portion indicated generally by reference numeral 35 in FIG. 1. For example suitable constructions of the float operated valve assembly comprise the float valve sold by Monoflo International, Inc. of McLean, Va. under the trade name "Mini 80" (part number 35503), or such as shown in U.S. Pat. No. 3,874,344. The float valve assembly 14 selectively allows or prevents the flow of water into the float box 10 from the source 23, and establishes a level or head of water, indicated by reference designation L in FIG. 1, within the float box. Preferably the float box and the valve assembly are dimensioned so that the distance of the level L established in the box 10 from the short pipe section 26 at the outlet opening is about 2 inches. This distance is indicated by reference designation D in FIG. 1.

The conduit 12 which is operatively connected to the outlet from the float box 10 preferably comprises a piece of circular cross-section plastic pipe (e.g. ¾ inch in diameter). Any conventional conduit may be used as a conduit 12. The conduit 12 typically is connected to the float box 10 in a relatively rigid manner. One simple but effective connector is provided by providing a collar 40, which has 0-rings (e.g. 41) associated therewith, and makes a sealing interference fit with conduit 12 and pipe section 26. Of course other suitable connecting mechanisms (such as screw threads) can be utilized.

Note (see FIG. 2) that the box 10 is only slightly wider than conduit 12 (e.g. a width of 2 inches) since it need not provide a large volume of water.

The length of the elongated conduit 12 typically is between about 8–10 feet. This provides a very practical distance, allowing the system according to the invention to replace conventional 8 foot waterers, and provides enough water dispensing mechanisms to be practical, while being effective in use with the float box 10. Preferably at the end of the conduit 12 opposite float box 10 a sight tube 42 is provided. The level of water in transparent material tube 42 is the same as that in box 10, and allows an operator to easily determine the level.

The animal-actuated water dispensing devices 16 may comprise any conventional devices. Preferably, the devices are what are commonly known as "nipples" or "nipple drinkers", and extend downwardly from the conduit 12, with an actuator portion 43 thereof extending downwardly from the bottom of each of nipples and engageable by the animal. Exemplary nipple drinkers that are effective include those sold commercially by Monoflo International, Inc. of McLean, Va., Ziggity Systems Inc. of Middlebury, Ind. and those such as shown in U.S. Pat. Nos. 3,008,451 and 4,402,343.

The mounting means 18 may comprise any suitable mounting means, such as conventional hanging brackets and wires presently used in poultry houses for multiple hundred foot lines. In the embodiment illustrated in FIGS. 1 and 2, brackets 45 are operatively connected to the conduit 12, and to a metal ballast/support pipe 47. The brackets 45 then are mounted to wire hangers 49 or the like which extend downwardly from the ceiling of the poultry house, or some other supporting structure. It is also desirable to provide a conventional anti-roost wire 51 which is supported by intermediate brackets 53 or the like, and is connected up to a source of low voltage electricity (not shown, and conventional). The ballast/support metal pipe 47 may comprise a part of the anti-roost system.

While the support means 18 supports the conduit 12 so that it is "generally" horizontal, there is no necessity that it be exactly horizontal, and in some circumstances a slight slope is appropriate.

Utilizing the apparatus described above, a method of supplying clean water directly to animals in an effective and cost-efficient manner is provided. The method steps comprise: Feeding water under relatively high pressure to the float box. Valving the flow of water into the float so as to establish a head of water in the float box. And, mounting the conduit and nipples so that they receive water from the float box and the head of water in the float box causes the water to flow under low pressure through the nipples when they are actuated by poultry.

The valving and mounting steps are preferably practiced so that a head of approximately 2 inches of water is provided in the float box, which supplies the motive pressure for water to flow through the nipples.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures, systems, and procedures.

What is claimed is:

1. An animal watering system consisting essentially of:
   a float box having means defining a water inlet opening into one portion thereof, and means defining a water outlet opening from another portion thereof;
   a rigid elongated conduit directly connected to said outlet opening and extending away from said float box;
   a float operated valve assembly operably connected to said inlet opening and disposed within said float box, and for selectively allowing and preventing the flow of water into said float box through said inlet to establish a predetermined level of water in the float box;
   means for mounting said elongated conduit so that it extends generally horizontally; and
   a plurality of animal-actuated water dispensing means connected to said conduit, spaced therealong, and for dispensing water therefrom in response to animal-actuation.

2. A system as recited in claim 1 wherein said animal actuated water dispensing means comprise a plurality of nipples extending downwardly from said conduit, with actuators extending downwardly from said nipples.

3. A system as recited in claim 2 wherein said mounting means comprises means for hangingly suspending said conduit and connected float box; and further comprising ballast and support providing means operatively mounted to and above said conduit.

4. A system as recited in claim 1 wherein said inlet opening is into an upper portion of said float box, and said outlet opening is from a lower portion of said float box; and wherein said means for mounting said elongated conduit mounts said conduit and said float box so that said inlet opening is operatively disposed above said outlet opening.

5. A system as recited in claim 4 wherein said float box includes a bottom which slopes at least a portion of the distance from adjacent said inlet opening toward said outlet opening.

6. A system as recited in claim 1 wherein said float box at said outlet opening comprises a short pipe section extending outwardly from said float box; and further comprising a collar connecting said pipe section to said conduit.

7. A system as recited in claim 1 wherein said conduit is at least about 8 feet long.

8. A system as recited in claim 1 wherein said conduit is about 10 feet long.

9. A system as recited in claim 1 further comprising anti-roost ridge means disposed on top of said float box.

10. A system as recited in claim 1 wherein said float box is constructed of plastic.

11. A system as recited in claim 1 wherein said float box and said float assembly means are dimensioned so that the distance between the liquid level established in said box by said float, and said outlet opening, is about 2 inches.

12. A float box comprising:
a plastic hollow body having closed top, bottom, and side walls, the top wall of said body sloping to an apex;
means defining an inlet opening in a side wall in an upper part thereof;
means defining an outlet opening in a side wall in a lower part thereof so that said outlet is below said inlet;
float operated valve means operatively connected to said inlet opening and disposed within said float box, and for selectively allowing and preventing the flow of water into said float box to establish a predetermined level therein;
connector means for connecting said outlet opening to a conduit;
said body being unconnected to other structures except at said inlet and outlet openings; and
an anti-roost ridge extending upwardly from said apex of said plastic body.

13. A float box as recited in claim 12 wherein said inlet and outlet openings are disposed in opposite side walls of said body.

14. A float box as recited in claim 13 wherein said bottom is sloped from said side wall containing said inlet opening toward said side wall containing said outlet opening.

15. A float box as recited in claim 12 wherein said connector means comprises a short pipe section operatively connected to said outlet opening and extending outwardly therefrom; and a collar for operative connection to said short pipe section.

16. An animal watering system comprising:
a float box having means defining a water inlet opening into one portion thereof, and means defining a water outlet opening from another portion thereof;
an elongated conduit connected to said outlet opening and extending away from said float box;
a float operated valve assembly operably connected to said inlet opening and disposed within said float box, and for selectively allowing and preventing the flow of water into said float box through said inlet to establish a predetermined level of water in the float box;
means for mounting said elongated conduit so that it extends generally horizontally comprising hanging means engaging said conduit;
a plurality of animal-actuated water dispensing means connected to said conduit, spaced therealong, and for dispensing water therefrom in response to animal-actuation; and
sight tube made of transparent material adjacent the end of said conduit opposite said float box, and extending upwardly from the conduit.

17. An animal watering system consisting essentially of:
a float box having means defining a water inlet opening into one portion thereof, and means defining a water outlet opening from another portion thereof;
a rigid elongated conduit directly connected to said outlet opening and extending away from said float box;
a float operated valve assembly operably connected to said inlet opening and disposed within said float box, and for selectively allowing and preventing the flow of water into said float box through said inlet to establish a predetermined level of water in the float box;
means for mounting said elongated conduit so that it extends generally horizontally, including hanging means operatively attached to said conduit, for supporting said conduit and said float box;
a plurality of animal-actuated water dispensing means connected to said conduit, spaced therealong, and for dispensing water therefrom in response to animal-actuation, and
a transparent material sight tube adjacent the end of said conduit opposite said float box, said sight tube in fluid communication with said conduit and extending upwardly from said conduit so that the level of water in the float box is reflected by the level of water in the sight tube.

* * * * *